June 1, 1965

R. L. SCHULTZ 3,186,640

CONTROL MECHANISM FOR CALCULATING MACHINES

Original Filed Aug. 4, 1960

INVENTOR.
Ralph L. Schultz
BY
Wupper, Hradolph & Love
ATTORNEYS

June 1, 1965 R. L. SCHULTZ 3,186,640
CONTROL MECHANISM FOR CALCULATING MACHINES
Original Filed Aug. 4, 1960 8 Sheets-Sheet 8

Fig. 17

INVENTOR.
Ralph L. Schultz
BY
Wupper, Gradolph & Love
ATTORNEYS

United States Patent Office 3,186,640
Patented June 1, 1965

3,186,640
CONTROL MECHANISM FOR CALCULATING MACHINES
Ralph L. Schultz, Chicago, Ill., assignor to Victor Comptometer Corporation, Chicago, Ill., a corporation of Illinois
Continuation of abandoned application Ser. No. 47,491, Aug. 4, 1960. This application Nov. 14, 1963, Ser. No. 325,803
12 Claims. (Cl. 235—60)

The present invention relates generally to calculating machines, and more particularly to means for controlling the operation of the accumulator with respect to its engagement with and disengagement from the actuating means therefor.

This application is a continuation of copending application Serial No. 47,491, filed August 4, 1960, now abandoned.

An object of the invention is to provide an improved mechanism for the control of a calculating machine in performing operations of addition and subtraction, multiplication by repeated addition, and division by repeated subtraction, and to make it possible to clear the amount set up in the pin carriage of the machine and to permit entry therein of another amount for following operations of addition, subtraction, and multiplication.

A further object is to provide means operable after the down stroke of a numeral key of a calculating machine to condition the machine for a normal add or subtract operation, and when not thus operated, upon depression of a function control key, to condition the machine for a total or subtotal cycle, depending upon which of the control keys is subsequently operated.

A further object is to provide a calculating machine having a correction key and stem, with means for holding the latter in operated position, and with means to prevent redepression of the key until the machine cycle is fully completed.

A further object is to provide a calculating machine in which means are provided to maintain in its accumulator a sum of a number of repeat items and to permit the addition of an additional series of repeat items, and to enable printing of the sum of such products.

Other objects will become apparent from the following description, reference being had to the accompanying drawings in which.

General organization

The present invention is an improvement upon the calculating machine shown in the prior patent to Lippert et al., No. 2,731,206, issued January 17, 1956, particularly with reference to the function control key linkages and interlocks, and reference may be had to this patent for the more general features of construction of the machine.

Figure 8:
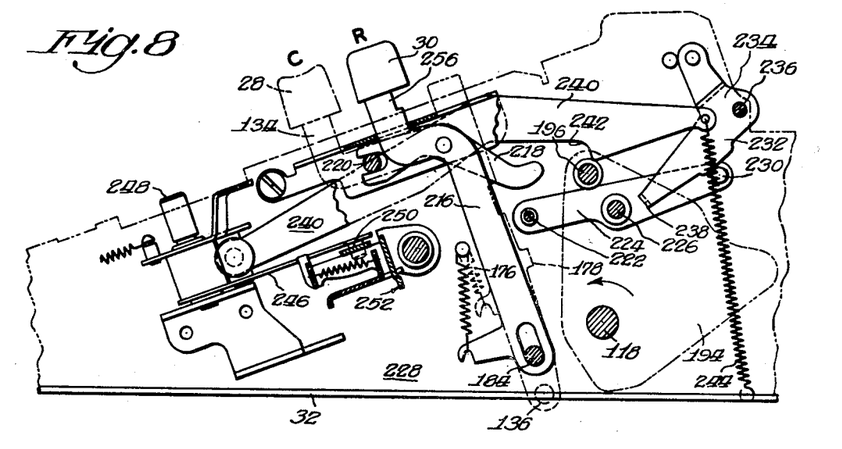
FIG. 8 is a fragmentary vertical sectional view showing the repeat and correction keys and some of the linkage controlled thereby.
Figures 13, 14:
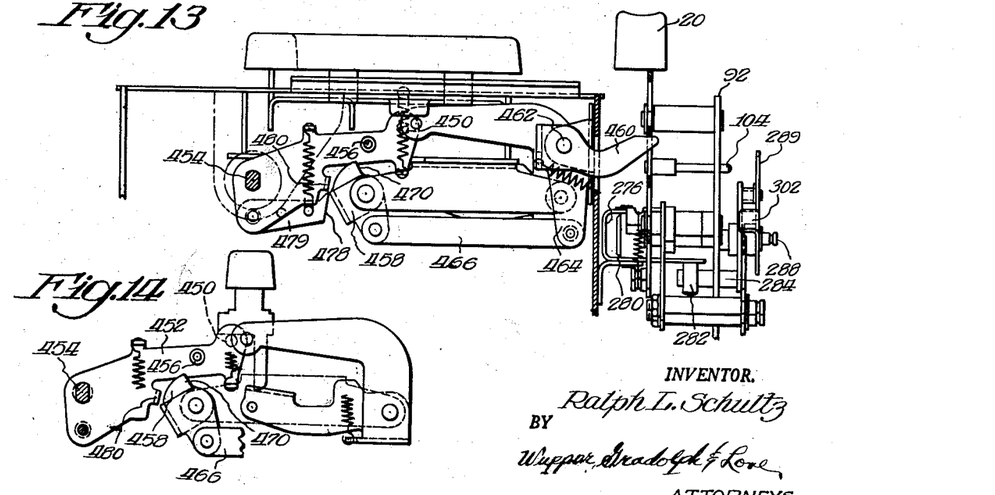
FIG. 13 is a fragmentary sectional view taken on the line 13—13 of FIG. 12.
FIG. 14 is a sectional view taken on the line 14—14 of FIG. 12.

The machine comprises a more or less conventional numeral keyboard having numeral keys 18 (FIGS. 13 and 14) and includes the following function control keys (FIG. 2): a combination subtotal and add key 20, a combination total and add key 22, a subtract key 24, a nonadd key 26, a correction key 28 (FIG. 10), and a repeat key 30 (FIG. 8).

The mechanism is housed in a customary casing including a bottom 32, a keyboard plate 34, the lower housing 36, and a hood 38. The machine includes a driving electric motor 40 which is energized upon closure of a switch 42 which is secured to an arm 43 by a screw 45, allowing for adjustment of the position of the switch 42 relative to an insulating disc 46 secured to a switch actuating arm 48. The arm 43 is pivoted about a stud 44 and is normally held by a spring 50 in engagement with a locating stud 52.

Hood mounting and safety latch

Figure 1:
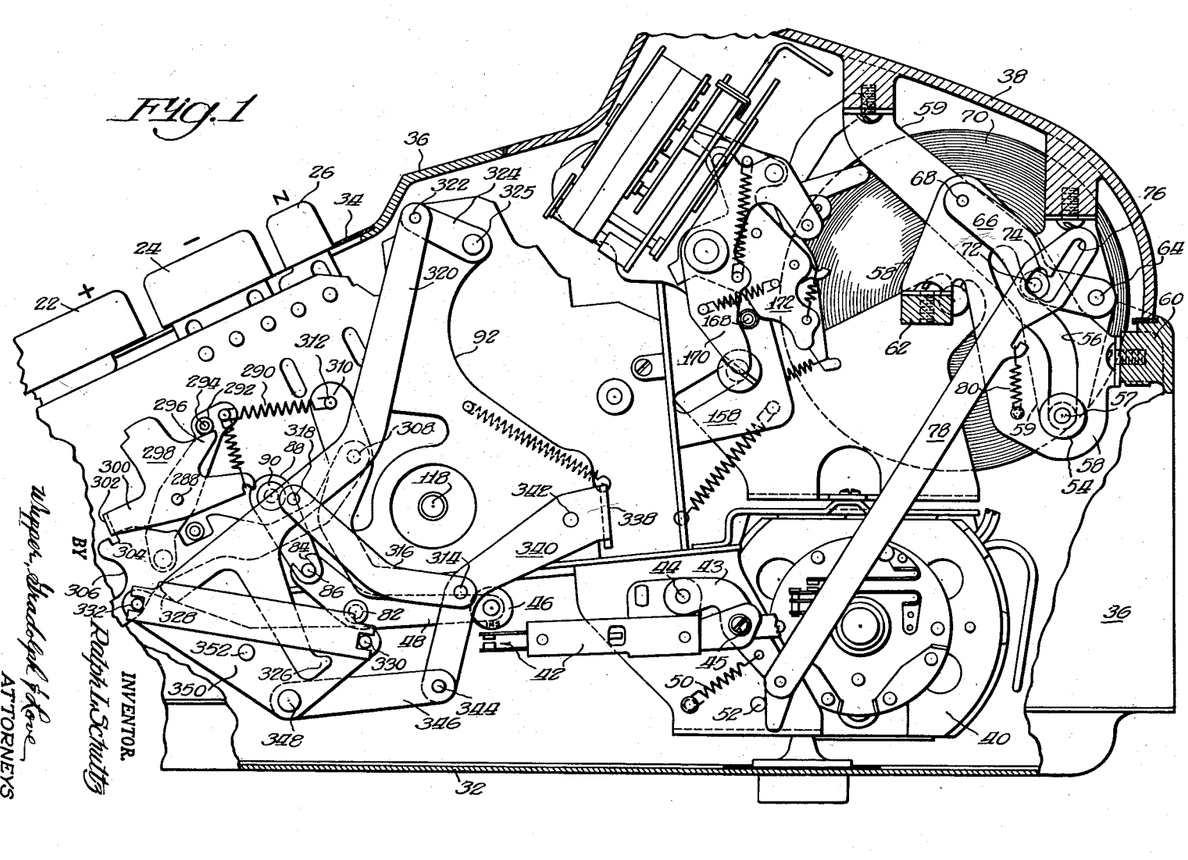
FIG. 1 is a vertical sectional view showing the mechanism mounted on the right-hand side of the right frame plate.

It is usually undesirable to permit an operation of the machine while the hood 38 is raised, and means to prevent this are shown in the aforesaid patent as well as an improved form thereof in the present application. The hood 38 is mounted so that its initial movement is upward and subsequently is pivoted rearwardly. This is accomplished by engagement of a friction roller 54 in a slot 56 formed in a bracket 58. (This hood mounting mechanism, as shown in FIG. 1, is duplicated at the left-hand side of the machine.) The friction roller 54 comprises a pair of spring pressed washers carried by a stud 57 mounted on a bracket 59 which is secured to the hood 38. The washers create sufficient friction to hold the hood 38 to any intermediate position to which it may be adjusted.

The bracket 58 is screwed to lugs 60 and 62 forming part of the bottom housing casting 36. The hood 38 is pivotally connected at 64 to an arm 66 which in turn is pivoted at 68 to the bracket 58. Due to the shape of the slot 56 it will be apparent that an initial upwardly directed force on the hood will cause its rollers 54 to ride upwardly in the lower vertical portion of the slot 56, pivoting link 66 counterclockwise and which through the pivot 64 will tend to cause the hood to have a component of upward motion, so that the hood will clear the roll of paper tape 70 and other parts of the machine, and will not bind against the adjacent portion of the casing 36. Continued application of an upwardly directed force at the forward end of the hood 38 will cause the hood to pivot about the stud 64, at which time the roller 54 will ride in the upper arcuate portion of the slot, which will then be concentric with the stud 64.

The link 66 at the right-hand side of the machine has a shouldered stud 72 projecting sidewardly therefrom, this stud being adapted to engage in a notch 74 forming part of an L-shaped slot 76 at the upper end of a link 78. As the link 66 swings counterclockwise, incidental to the initial upward movement of the hood 38, its stud 72 engages in the notch 74 raising the link 78. The link 78 is pulled upwardly against a spring 80 and the lower end of the link 78 is pivoted to the arm 43 so that as the link is raised the switch 42 is swung counterclockwise about the pivot 44 so as to be beyond the path of movement of the insulating washer 46. Thus, operation of any of the control keys will be ineffective to initiate a machine cycle. However, a serviceman may occasionally desire to cause a machine cycle while the hood is raised, and for this purpose he may disengage the notch 74 from the stud 72 and permit the spring 80 to snap the link 78 downwardly as the elongated portion of the notch 76 passes around the stud 72, in which event the switch 42 will be returned to its normal position in condition to be operated by the control keys.

Motor operation

As previously indicated, the motor switch 42 is closed when a bell crank 48 is swung clockwise to bring its insulating disc 46 into engagement with the switch contact arm to flex the latter into engagement with its counterpart. This bell crank 48 is pivoted on a shaft 82 and has an open end notch 84 in which a shouldered stud 86 is engageable, this stud being carried by a crank 88 pivoted on a stud 90 which is mounted on the right-hand frame plate 92. A motor trip slide 94 is provided with an elongated slot 96 which embraces the stud 90. The motor trip slide 94 has a downwardly extending portion 98 which has an open end slot embracing a stud 100 secured to the arm 88. The motor trip slide 94 is guided for longitudinal movement upon a pair of rollers 102, 103, which extend through suitable elongated slots in the slide. Each of the stems of the control keys 20, 22, 24, and 26 is provided with a sidewardly extending stud 104. These studs are cooperable with oblique cam surfaces 106 formed on the slide 94, so that upon depression of any of these control keys the slide 94 will be moved rearwardly and due to the engagement of the forked lower end of the slide 94 with the stud 100 will swing the arm 88 counterclockwise, and through the stud 86 and open end slot 84 swing the bell crank 48 clockwise to close the switch 42.

Control key latch

Figures 3, 4:
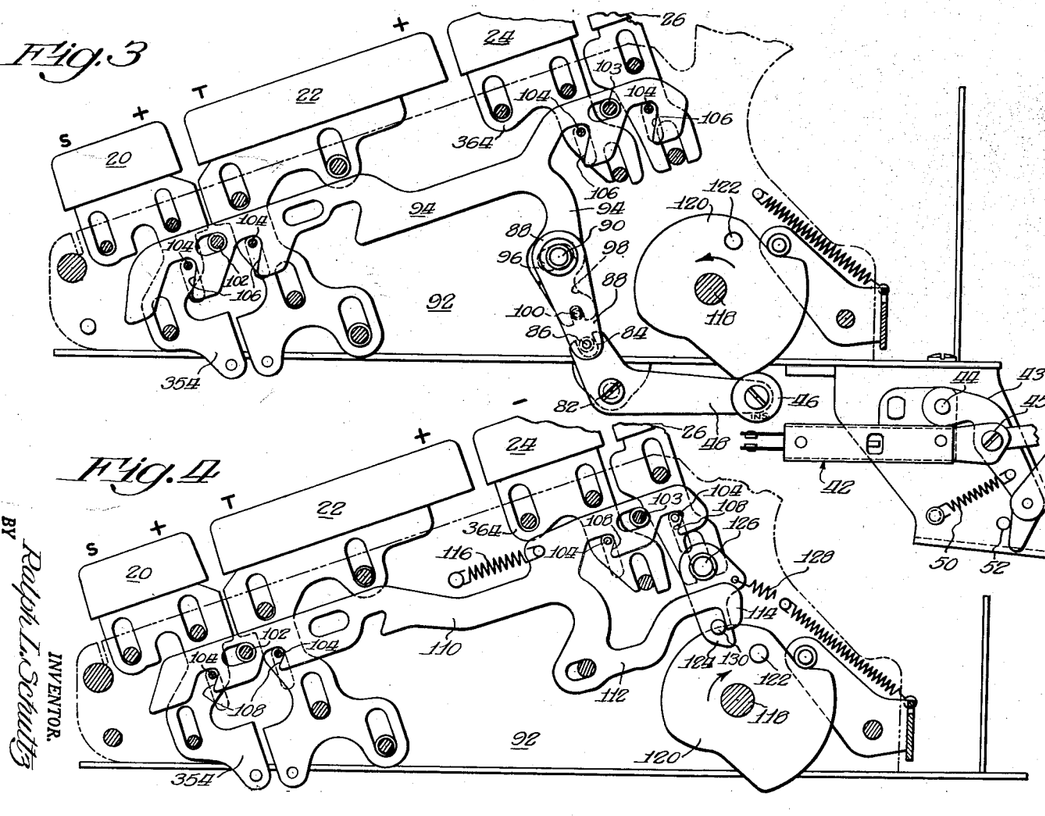
FIG. 3 is a similar view, showing particularly the linkages for operating the motor control switch.
FIG. 4 is a similar view, showing particularly the control key latching and release mechanism.

It is desirable or necessary to latch an operated control key 20, 22, 24, 26 in its depressed position during the operating cycle of the machine. This is accomplished by the key latching means shown in FIG. 4. The previously mentioned studs 104 extending sidewardly from the several control key stems engage oblique cam surfaces 108 formed on a key latch slide 110, which is also guided for longitudinal movement on the rollers 102 and 103. The slide 110 has a downwardly and rearwardly extending arm 112 terminating in a hook 114. It will be understood that the latching slide 110 is biased to move to its forward position by a spring 116 so that upon full depression of the key the stud 104 thereof will pass beyond the end of the cam surface 108, permitting the slide 110 to be moved forwardly by the spring 116 and thus preventing the return movement of the key under its usual return spring. Furthermore, by means hereinafter to be described, depression of other of the control keys is prevented.

The calculating machine herein disclosed is adapted to be manually operated or driven by the electric motor 40. Therefore, it is provided with a main rock shaft 118 to which the customary crank handle is connected so as to rock the shaft through an angle of approximately 100°, from which position it is returned to normal position by customary springs.

The main shaft is provided with a plate cam 120 which carries a stud 122 engageable with a wipe pawl 124 pivoted on a stud 126 secured to the right side frame plate 92. On the forward stroke the stud 122 wipes past the pawl 124, which is held in its normal position by a spring 128, but on the return stroke the stud 122 strikes the pawl 124 and through engagement with a stud 130 on the latter abuts against the hook portion 114 to move the slide 110 rearwardly to release the depressed control key.

Control key lockout

It is undesirable to have the operator press more than one of the control keys at a time. The correction key 28 (FIG. 9) has a stem 134 suitably mounted for substantially vertical movement. The lower end of this stem has a sidewardly extending stud 136 which is engageable with an arm 138 fixed to shaft 82 at the right-hand end of which there is secured an arm 140. The end of arm 140 is pivotally secured to a link 142 biased to move rearwardly by a spring 144. The forward end of this link is pivotally connected to an arm 146 secured to a shaft 148. The arm 146 is formed integral with an upwardly extending arm 150 which is engageable with one of a series of lockout pendants 152. The pendants are arranged in a line and are spaced a sufficient distance so that only one of the sidewardly extending studs 104 on the control key stems can cam its way between a pair of adjacent pendants 152.

The arm 150 operates effectively as one of the pendants 152, so that when the correction key is operated all of the pendants are swung rearwardly into contact with one another, thereby to prevent the depression of any other control key. By this means malfunction of the machine, due to improper operation of the control keys, is prevented.

Correction key operation

Upon depression of the correction key several functions must be performed. The other control keys must be locked against depression, as has been described; the printing mechanism must be disabled; the drive for the paper feed mechanism must be disconnected; the accumulator control must be positioned so as to prevent engagement of the accumulator with its actuating racks; and the restoring mechanism for the stop pin carriage must be conditioned for operation, thereby returning any set pins to normal position; and, in the case of an electric motor driven machine, close the motor switch.

These functions are accomplished as follows: The stud 136 projecting from the lower end of the stem 134 for the correction key, as previously described, engages an arm 138 (FIG. 9), swinging the latter clockwise and causing it to engage a stud 156 on a pair of links 158 (only one shown in FIG. 9), swinging the latter counterclockwise to disengage notch 160 therein from a stud 162 carried by a plate cam 164 secured to the rock shaft 118, thereby severing the driving connection which normally swings the platen carrying frame structure 166 toward the type. The link 158 has a stud 168 which, as shown in FIG. 1, normally operates the paper feed cranks 170 and 172, in a manner shown in my prior Patent No. 3,075,626, issued January 29, 1963.

Figures 9, 11:
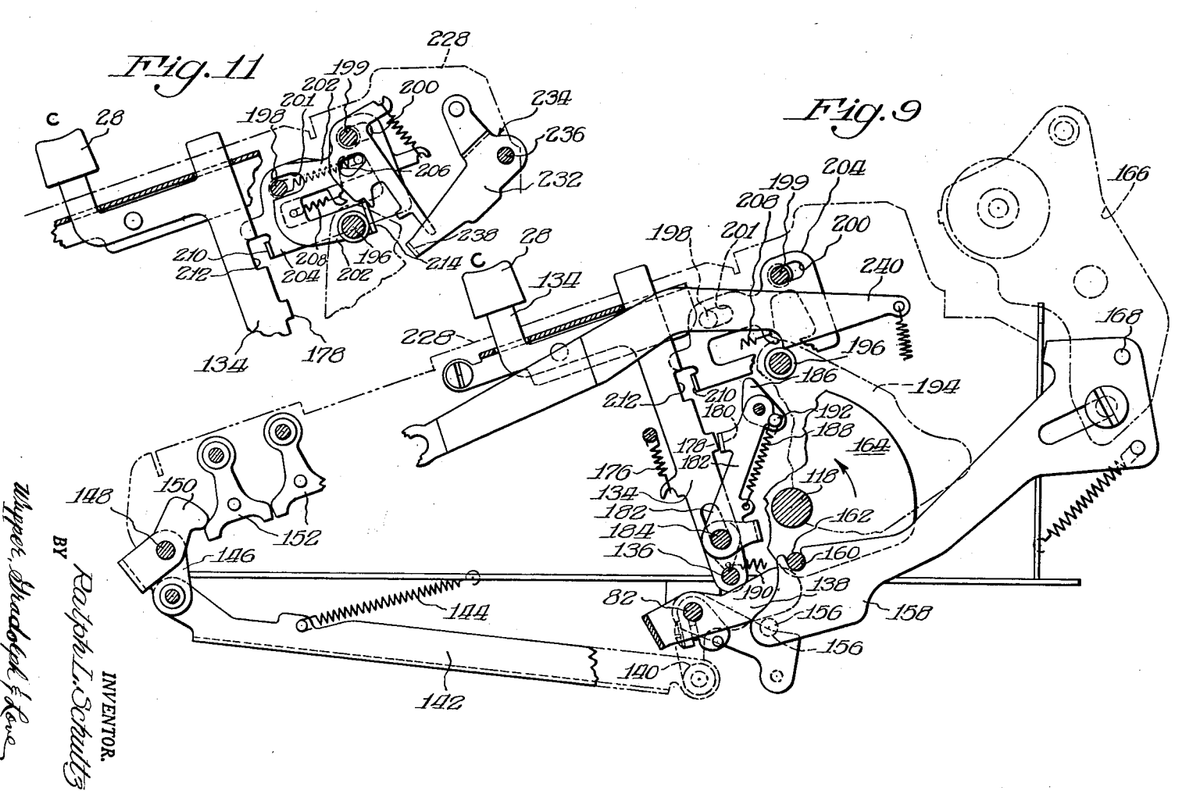
FIG. 9 is a fragmentary vertical sectional view showing particularly the linkage operated by the correction key, and the means for restoring the latter.
FIG. 11 shows a safety interlocking device to prevent misoperation of the control keys.
Figure 17:
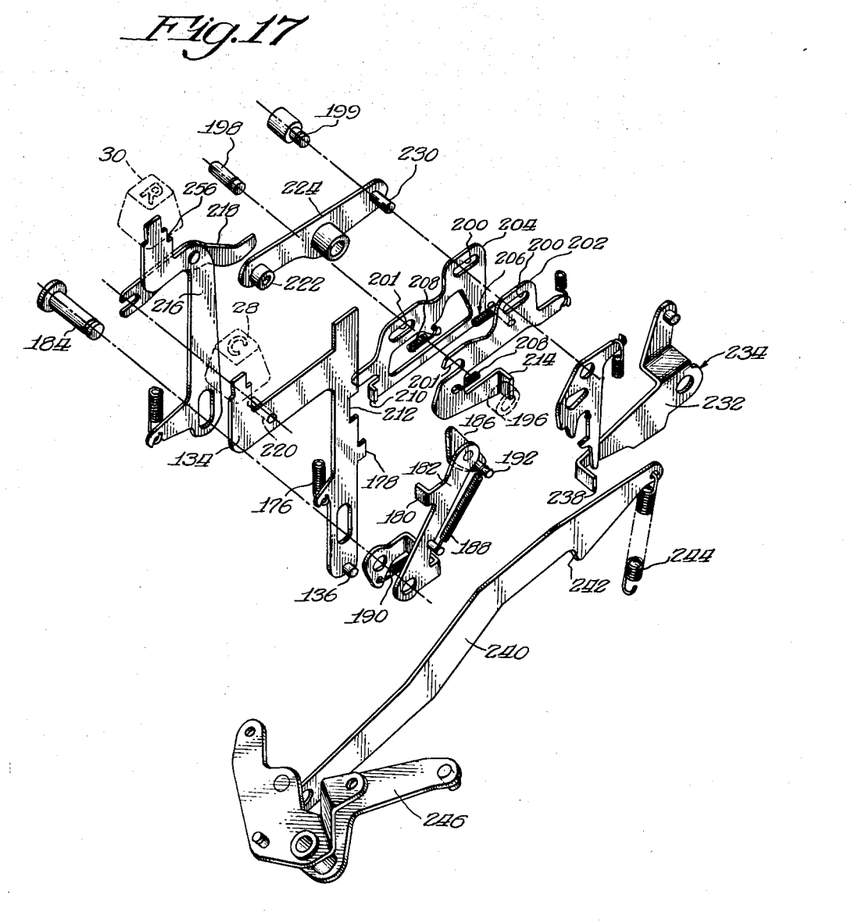
FIG. 17 is an exploded perspective view of the repeat and correction keys and certain of the linkage controlled thereby.

Means are provided to prevent depression of the correction key 28, which are best shown in FIGS. 9, 11, and 17. The stem 134 of the correction key 28 has a return biasing spring 176 and is provided with a rearward projection 178 for engagement with a sidewardly extending lug 180 formed on an arm 182 pivoted on a stud 184. This arm carries a wipe pawl 186 at its upper end, which is biased to the position shown in FIG. 9, by a spring 188. The arm 182 is biased to swing counterclockwise by a suitably anchored spring 190 secured at its lower end.

When the correction key 28 is depressed the arm 182 swings counterclockwise so as to have its lug 180 overlie the projection 178 on the key stem, thus latching the key in depressed position. The wipe pawl 186 is held in the position shown in FIG. 9 by virtue of engagement of a stud 192 thereon with the edge of the arm 182. The main shaft 118 is provided with a cam plate 194 secured thereto, this plate carrying a roller 196 which upon the forward stroke wipes past the pawl 186, but on its return stroke engages the forward edge of the latter and moves the arm 182 clockwise to move the lug 180 from latching position, freeing the key stem 134 for its return movement by its spring 176.

When the correction key stem has thus been released shortly before the end of the return stroke, means must be provided to prevent a second depression thereof until the cycle has been fully completed, that is, during the coasting period of the motor. This safety means, shown best in FIGS. 11 and 17, comprises a pair of cooperating latching members 202 and 204 guided upon studs 198 and 199 which extend through suitably elongated slots 200 and 201. The latching member 202 is biased by spring 206 to move to the left (FIG. 11) and this spring thus tends, through spring 208, to move the latching member 204 leftward. The latching member 204 is provided with a lug 210 at its forward end which is adapted to engage the rearward edge of the stem 134, which in its vicinity is provided with a notch 212 into which the lug 210 may project.

During each operating cycle of the machine, as the stud 196 swings forwardly it moves away from a sidewardly bent lug 214 formed on the member 202, permitting the spring 206 to bring the lug 210 against the edge of the key stem 134. During a correction key controlled cycle, the stem will have been moved to a position so that the lug will engage the stem above the notch 212 and the springs 206 and 208 will hold this lug against the rearwardly facing edge of the key stem until, shortly before the completion of the forward stroke, the stud or roller 196 engages the wipe pawl 186 and thus moves the lug 180 (FIG. 9) from above the projection 178, permitting the key stem to move upwardly to normal position. As it does this the lug 210 enters the notch 212 so as to provide a safety latch to prevent inadvertent redepression of the correction key 28 during the short period before the cycle is completed. This additional safety latching means is provided to permit the reengagement of the studs 162 in the slots 160 of the links 158 (FIG. 9), as well as to permit other parts to be restored to normal position.

*Repeat operation*

As in prior art machines of the ten-key type, it is necessary, for repeat operations, to maintain the setup in the pin carriage. In the present machine this is the case except when the correction key is depressed, in which case the pin carriage will be moved to restore the stop pins to normal position, that is, clearing the amount set up therein, while nevertheless leaving the repeat key depressed. This is accomplished by the mechanism shown particularly in FIGS. 8, 12, 16 and 17.

The repeat key stem 216 has a lever 218 pivoted thereto, this lever having a forwardly extending arm provided with an open end slot engaging a stud 220 extending sidewardly from the stem 134 of the correction key 28. Upon depression of the repeat key the rearwardly extending arm of the lever 218 engages a roller 222 at the forward end of a lever 224, the latter being pivoted on a stud 226 secured to the left control frame plate 228 of the machine. This lever 224 at its rearward end has a sidewardly extending stud 230 which engages with the lower edge of an arm 232 of a lever 234 which is pivoted on a stud 236. At the forward end of the arm 232 there is a sidewardly extending lug 238 which may engage the lower surface of a pin carriage restoring arm 240. This restoring arm 240 has a notch 242 which is adapted to be engaged by the roller 196 on cam plate 194 (see also FIGS. 8 and 9). The pin carriage restoring arm is biased to swing downwardly by a suitably anchored spring 244 so that it will normally be in a position to be engaged by the roller 196 during the return stroke so as to pull the pin carriage restoring arm 240 rearwardly.

Figure 12:
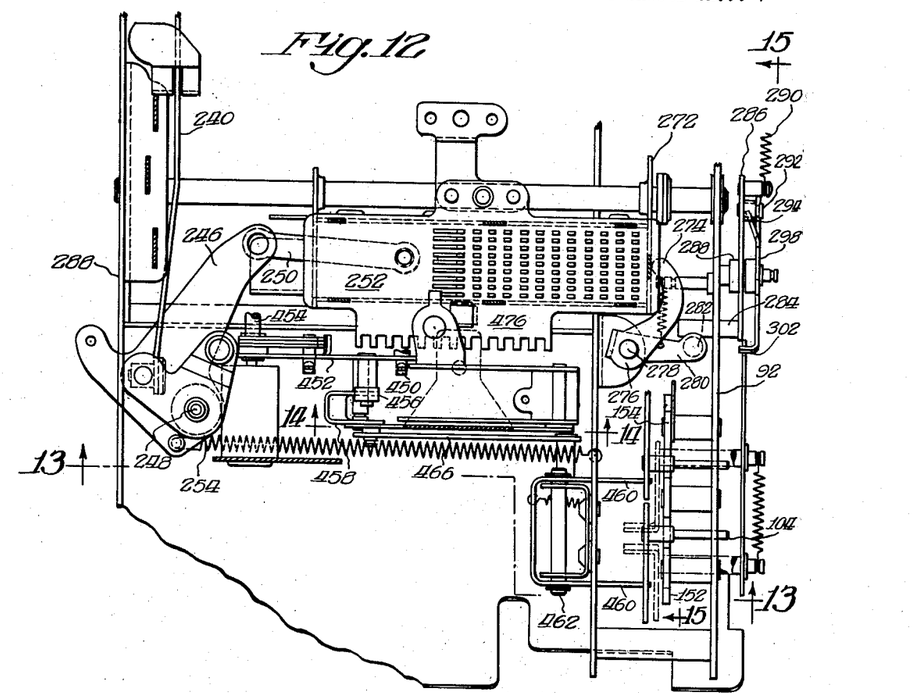
FIG. 12 is a fragmentary generally horizontal sectional view showing the pin carriage position sensing means and the interlocks between the total and subtotal control keys, and the numeral keys.

As shown in FIG. 12, the restoring arm 240 is universally connected to a bell crank 246 pivoted on a stud 248. This bell crank is connected by a link 250 to the frame of a stop pin carriage 252 which is biased to move leftward by one or more springs 254 and is stepped leftward by the operation of the usual escapement mechanism. The repeat key stem 216 is provided with a notch 256 which engages the key plate to hold the repeat key in depressed position. If, when the repeat key is thus latched in depressed position, the correction key is depressed, the lever 218 will be swung counterclockwise from its then position about its pivotal connection with the stem 216, and thereby raise its rearward arm away from the stud 222 so that the lever 224 may swing clockwise and bell crank 232 swing counterclockwise, lowering the lug 238 of the latter away from the lower edge of the pin carriage restoring link 240. Thus, the pin carriage may be restored to normal position in the manner just described, without releasing the repeat key. This is a convenience when it is desired to add the products of several numbers, that is, when the sum of a number of products is to be obtained.

Figures 10, 16:
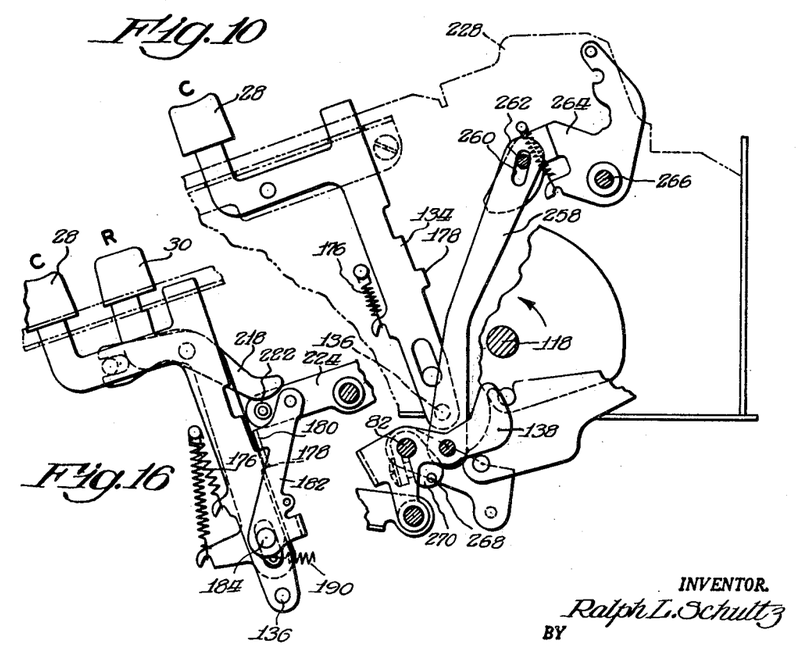
FIG. 10 is a fragmentary sectional view showing the linkages operated by the correction key to cause a nonadd cycle.
FIG. 16 is a fragmentary vertical sectional view similar to FIG. 8, showing the repeat key in latched depressed position and the correction key in the depressed latched position.

As shown in FIG. 10, the arm 138 which is swung clockwise on pivot 82 upon depression of the correction key by the means previously described with reference to FIG. 9, has a link 258 pivoted thereto, and this link at its upper end has an elongated slot 260 embracing a stud 262 on an arm 264 secured to a shaft 266 which, as is well known in the prior art, causes the machine to go through a nonadd cycle.

Depression of the correction key 28 by swinging lever 138 clockwise causes the latter to engage a stud 268 on arm 270 which is clamped to the motor switch control shaft 82. As previously described with reference to FIG. 3, the shaft 82, by its clockwise rotation, closes the switch 42. The manner of operation of the correction key 28 and repeat key 30 may best be understood by a comparison of FIG. 8, which shows the keys in normal position, and in FIG. 16, in which they are shown in depressed position, the repeat key 30 being latched in such position.

*Add and total taking operations*

A feature of great convenience in this machine resides in the fact that depression of either key 20 or 22 will cause an adding operation if there is an amount set up in the pin carriage, that is, the stop pin carriage is displaced to the left from its normal position. However, if the stop pin carriage is in its normal home position, operation of the key 20 will cause a subtotal operation, while operation of the key 22 will cause a total taking cycle.

It will be noted from FIG. 12 that the right-hand end wall 272 of the pin carriage 252 engages one arm 274 of a bell crank lever 276 pivoted on a generally vertical shaft 278. The other arm 280 of the bell crank has a downwardly extending pin 282 which normally engages a pin 284 which extends through a suitable opening in the right-hand control frame 92. The stud 284 is mounted on the lower arm of a lever 286 (FIG. 15) pivoted at 288, and biased for clockwise movement by a spring 290. The upwardly extending arm of the lever 286 has a sidewardly extending stud 292 carrying a roller 294. The roller normally rests upon a rearwardly extending arm 296 (FIG. 1) of a lever 298, likewise pivoted on stud 288. The forwardly extending arm 300 (FIG. 2) of the lever 298 has a sidewardly extending lug 302 adapted to engage in a notch 304 formed in a slide 306, the rearward end of which is pivoted at 308 to an arm 310 which in turn is pivoted on a stud 312. The arm 310 extends downwardly and has at its lower rearward end a sidewardly extending stud 314. This stud forms a pivotal connection for a link 316. The forward end of the link 316 is pivoted at 318 to an accumulator control arm 320. The latter arm has its upper end pivoted at 322 to an arm 324 which is secured to a total-subtotal control shaft 325, the latter operating in the manner shown in Mehan Patent No. 2,411,050 to control the timed engagement and disengagement of the accumulator during subtotal and total taking operations. The arm 320 at its lower end has a hook or toe 326 and a push projection 328 for engagement respectively with studs 330 and 332, depending upon the position to which the accumulator control arm 320 is shifted in response to movement of the slide 306.

Power for shifting the accumulator into and out of engagement is derived from the cam 120 engaged by a follower roller 334 carried by an arm 336 of a bail 338, the other arm 340 of the bail being pivoted at 342 and being pivotally connected at 344 to an actuating link 346, the other end of which is pivotally connected at 348 to an accumulator total and subtotal control crank 350 pivoted on a stud 352.

In the course of an operative cycle of the machine, the bail 338 is initially swung clockwise by its associated cam 120, thereby, through the link 346, rotating the crank 350 clockwise. Then, depending upon the position of the link 320, as determined by slide 306, the machine will be conditioned either to take a total, when the link is swung counterclockwise from the position shown in FIG. 2, so as to bring the hook 326 beneath the stud 330, or to take a subtotal when the link 320 is swung clockwise from the position shown in FIG. 2, so as to bring its pushing projection 328 above the stud 332.

When the subtotal and add key 20 is depressed, its key stem 354 (FIG. 2) stretches a spring 356 which connects the key stem to a crank arm 358, thus biasing the crank for clockwise movement. Such clockwise movement can occur only when the lug 302 is not engaged in the notch 304 of the slide 306. If the lug 302 is engaged in this notch, a normal add cycle will take place because neither the hook portion 326 or the push projection 328 will be in alignment with the studs 330 and 332 respectively.

The accumulator engaging and disengaging mechanism, and the control therefor to cause such operations to take place at the proper time in the cycle, are more fully shown in the aforesaid Mehan patent, particularly FIGS. 4, 5, and 6 thereof.

However, when the lug 302 (FIG. 2) is in its notch 304, the total taking slide 306 is locked against movement and the depression of the key 20 results merely in stretching the spring 356 so that if this key is held depressed throughout more than one cycle it will be effective to swing the bell crank 358 clockwise and through the slide 306 condition the mechanism for subtotal taking operation.

The total and add key 22 operates mechanisms quite similar to, and in part in common with, the mechanism operated by the subtotal key 20. Depression of the key 22 stretches a spring 360 attached to a bell crank 362, provided the lug 302 is in the slot 304, to lock the total control slide 306, but if the slide 306 is not thus locked in position the tensioning of the spring 360 will cause the crank 362 to swing counterclockwise and move the total control slide 306 rearwardly, which through the linkage previously described, will cause the hook portion 326 of the link 320 to be positioned beneath the stud 330 so that the power mechanism driven from the cam 120 will cause the shaft 325 to swing counterclockwise, and through the mechanism disclosed in said patent to Lippert et al., will result in a total taking cycle.

Subtract operation

The subtract key 24 has a stem 364 (FIG. 6) which is suitably guided by stud and slot means. As previously mentioned, the stem 364 has a sidewardly extending stud 104 which operates in connection with the pendants 152 to prevent simultaneous depression of more than one control key, latching the key in depressed position, and operating the motor switch control means.

An additional function performed by the stud 104 is to engage and slide downwardly a key stem extension 366 which is suitably guided for rectilinear movement by studs 368 and 369, and normally biased upwardly by a spring 370 to maintain its upper edge in engagement with the stud 104.

When key 24 is operated a stud 372 positions a pusher pawl 374, pivoted at 376, to allow the rearward end thereof to engage the larger diameter portion 378 of a shoulder stud 380, such swinging movement of the pawl being caused by a spring 382. The pivot 376 is secured to a crank 384 pivoted on a stud 386. The crank 384 is suitably secured to an arm 388 (FIGS. 6 and 7) which has a stud and open end slot connection 390 with a lever 392 pivoted on a stud 394. A roller bearing stud 396 extends sidewardly from the other end of the lever 392 to position the signal printing mechanism (FIG. 7) and to condition the machine for a subtract cycle.

The power for operating the last described linkage is derived from the main shaft 118 (FIG. 6) and the cam 120 affixed thereto, the latter engaging a follower roller mounted on a stud 398 extending sidewardly from a crank 400 pivoted on stud 402. This crank carries the shouldered stud 380 previously mentioned.

Nonadd operation

Figures 5, 6, 7:
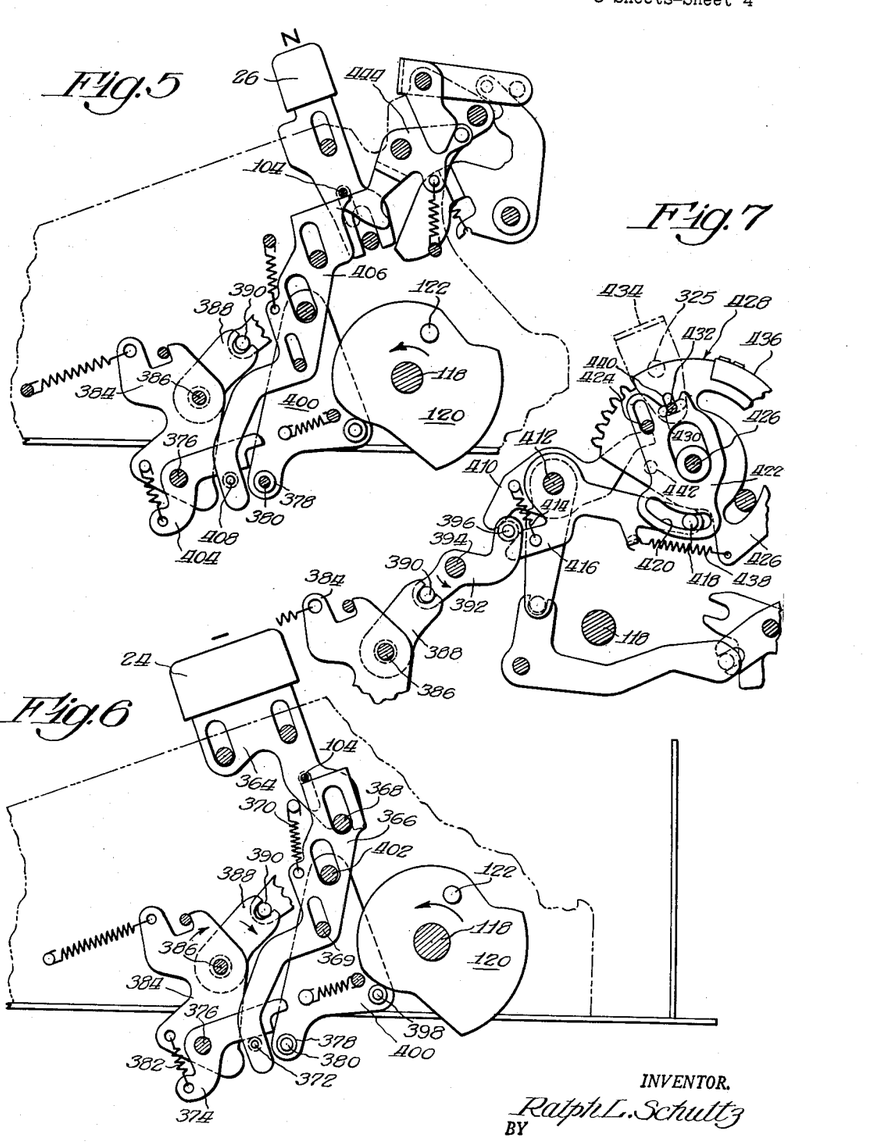
FIG. 5 shows the linkages operated by the nonadd key and the restoring means therefor.
FIG. 6 is a similar view, showing the mechanism operated by the subtract key and the restoring cam therefor.
FIG. 7 is a fragmentary vertical sectional view showing the means for positioning the nonadd and subtract signaling type.

By referring to FIG. 5, it will be noted that the shouldered stud 380 is adapted to have its smaller diameter portion be engaged by a pawl 404 which is similar in shape to the pawl 374, and is pivoted on the same stud 376. When the nonadd key 26 is depressed a sidewardly extending stud 104 thereon depresses key stem extension 406, suitably mounted for downward sliding movement, and by virtue of a stud 408 on this extension, permits the push pawl 404 to swing downwardly in position to be engaged by the small diameter portion of the stud 380.

In the course of operation of the machine, as the crank 400 is swung clockwise and the stud 380 engages the pawl 404, the crank 388 will be swung clockwise, but to a lesser extent than when the larger diameter portion 378 of the stud 380 engages the push pawl 374. As a result, in a nonadd cycle the lever 392 will be swung counterclockwise through a smaller angle than when the substract key 24 is depressed.

The nonadd key 26 operates through stud 104 to swing a lever 444 counterclockwise, and through the customary linkage prevents the accumulator from being moved into engagement with its actuators on both the forward and return strokes.

Printing function symbols

As the lever 392 swings counterclockwise, the stud 396 thereon engages one arm of the lever 410 pivoted on a rod 412. This lever is connected by a tension spring 414 with a lever 416 likewise pivoted on the rod 412. The lever 416 at the end of its rearwardly extending arm carries a stud 418 which rides in an arcuate slot 420 formed in a slidable gate 422 guided by a stud and slot connection 424 and by the printing type shaft 426 on which the type carriers are rotatable. The particular type carrier shown in FIG. 7, and numbered 428, carries the type for the printing signals, "T" (Total), "S" (Subtotal), "—" (Subtracted or Minus), and "N" (Nonadd).

Figures 2, 15:
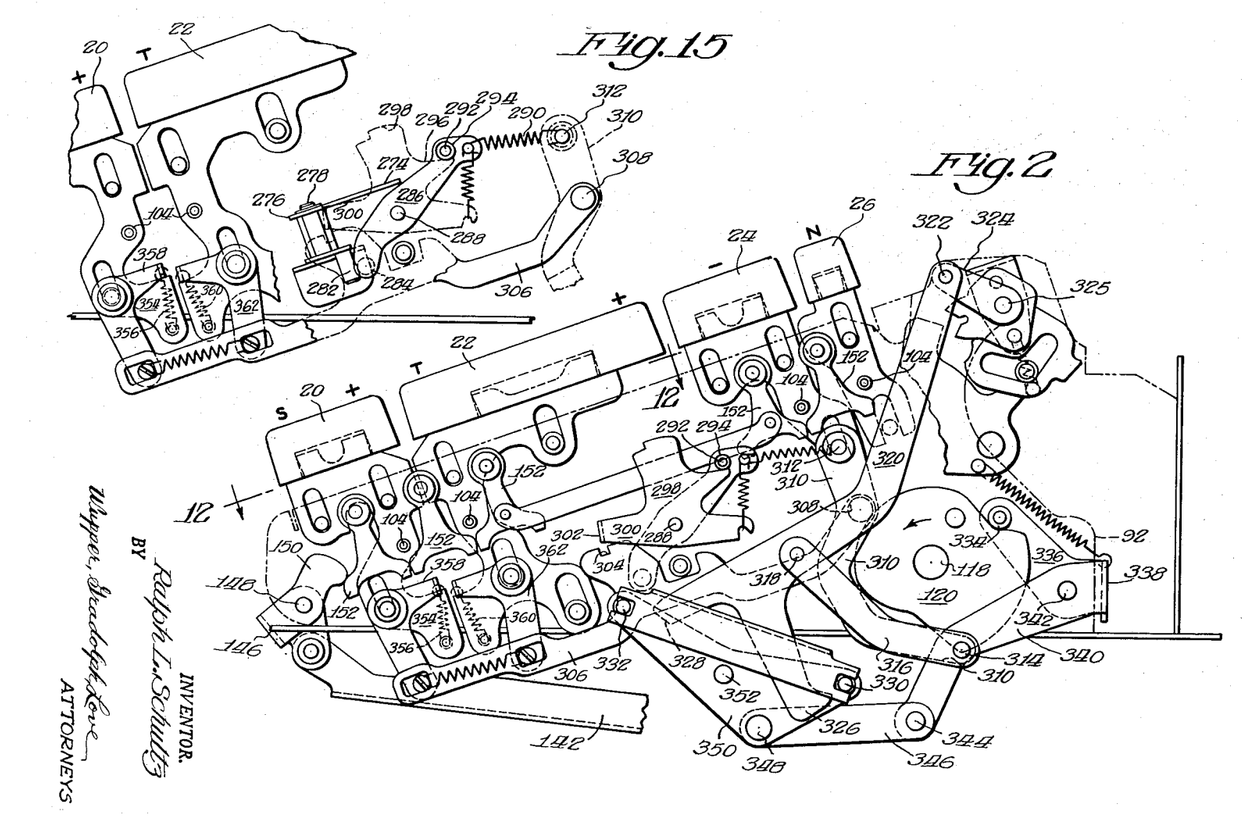
FIG. 2 is a similar view, showing the mechanism in greater detail.
FIG. 15 is a sectional view taken on the line 15—15 of FIG. 12.

The slide gate 422 has a notch 430 at its upper end which is normally in engagement with a stud 432 which is secured to an arm 434 carried by the shaft 325 (FIG. 2). When the slide gate 422 is lowered (FIG. 7) during a nonadd cycle, as previously described, the signal type segment 436 is rotated clockwise by a spring 438 to bring the "N" type in printing position, such motion being limited by the engagement of the left-hand portion of an inverted T-shaped slot 440 in the printing sector 428 with the stud 432.

During a cycle of subtraction, the lever 392 is likewise moved counterclockwise, but due to the fact that the push pawl 374 engages the large diameter portion of the stud 378, the lever 410 will be swung clockwise through a greater angle and through its rearwardly extending arm will engage a stud 442 secured to the type sector 428, and although the spring 438 will have initially tended to rotate the type sector clockwise (as in a nonadded cycle), the lever 410 will rotate the type carrier 428 counterclockwise to cause the right-hand (FIG. 7) portion of the inverted T-shaped slot 440 to be arrested by the stud 432. By such movement the type sector will bring the minus sign type in printing position. The "S" and "T" signals are printed by type on the carrier 428 and the latter is appropriately positioned by the usual mechanism, such as shown in said Lippert et al. patent.

Lockout between numeral keys and add and total taking keys

A suitable interlock is provided to prevent simultaneous depression of one of the numeral keys 18 and either the subtotal and add or the total and add keys 20 and 22. This mechanism is shown principally in FIGS. 12, 13, and 14.

As is customary in adding machines of the ten-key type, each of the key stems has a shoulder which engages a rod for actuating the escapement mechanism. Such rod is shown at 450 in FIGS. 12, 13, and 14. This rod 450 is carried by a pair of bail arms 452 pivoted on a shaft 454 which has flattened portions for keying it to the arms 452. The front arm 452 has a roller stud 456 extending forwardly therefrom for engagement with a bail shaped stop or blocking member 458 when the latter is swung clockwise from the position shown in FIG. 14. This block member is moved to blocking position upon depression of either of the keys 20, 22, by the following means.

The stems for the keys 20 and 22 have a portion (FIG. 13) overlying bail arms 460 pivoted on a shaft 462, and the bail 460 having a downwardly extending arm 464 connected by a link 466 with the blocking member 458. Thus, when either the key 20 or 22 is depressed, the blocking member will be moved in position beneath the roller stud 456 and thus prevent depression of any of the numeral keys. If one of the numeral keys 18 is depressed, the roller stud 456 will be moved to a position in front of the radial face 470 of the blocking member 458, and thus depression of keys 20 and 22 will be prevented.

The escapement mechanism which cooperates with the teeth on a rack-like member 476 (FIG. 12) is of conventional construction, and operates upon the down stroke of any of the numeral keys 18 to permit limited leftward movement of the carriage a distance represented by the lateral displacement of the right-hand edge 478 of the escapement pawl and the lug 480 on the other escapement pawl; that is, one of the teeth of the rack-like member 476 will normally rest against said edge 478 of the pawl 479, but when any numeral key is depressed the pawl 479 will be moved downwardly so that the edge 478 thereof will clear the tooth of the rack, whereupon the springs 254 will bring said tooth against the end of the lug 480. This movement, although slight, will be sufficient to permit the sensing arm 274 to operate to condition the controls for an adding operation, rather than permitting the controls to be conditioned for a total or subtotal operation. The fact that the position of the carriage is immediately sensed upon the down stroke of a numeral key makes the control more sensitive and less likely to cause misoperation or jamming of the machine because the portion of the cycle allowed for this operation is adequate.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is registered, a shaft positioning mechanism comprising a combination add and total taking key, a combination add and subtotal taking key, a first linkage controlled by the combination keys and conditioned to shift the shaft from its normal position to the second or third position upon actuation respectively of the total or subtotal keys when no amount is registered in the pin carriage, and a second linkage controlled by the pin carriage engageable with the first linkage to prevent operation thereof and to maintain the shaft in its normal position when an amount is registered in the pin carriage and to release the first linkage for operation immediately at the conclusion of an add cycle of the machine.

2. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is registered, a shaft positioning mechanism comprising a combination add and total taking key, a combination add and subtotal taking key, a first linkage controlled by the combination keys and conditioned to shift the shaft from its normal position to the second or third position upon actuation respectively of the total or subtotal keys when no amount is registered in the pin carriage, a second linkage controlled by the pin carriage engageable with the first linkage to prevent operation thereof and to maintain the shaft in its normal position when an amount is registered in the pin carriage and to release the first linkage for operation immediately at the conclusion of an add cycle of the machine, and motor operated timing means actuating the conditioned first linkage to move the shaft to its second and third positions in timed relation with the operation of the machine.

3. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is registered, a shaft positioning mechanism comprising a combination add and total taking key, a combination add and subtotal taking key, a first linkage controlled by the combination keys and conditioned to shift the shaft from its normal position to the second or third position upon actuation respectively of the total or subtotal keys when no amount is registered in the pin carriage, a second linkage controlled by the pin carriage engageable with the first linkage to prevent operation thereof and to maintain the shaft in its normal position when an amount is registered in the pin carriage and to release the first linkage for operation immediately at the conclusion of an add cycle of the machine, and motor operated means cycling the machine upon operation of the combination keys through add, total, and subtotal taking cycles depending upon the conditioning of the linkages and the combination key operated, whereby manual holding of the operated key in operated position through and after an add cycle will result in an immediate total taking cycle of the character indicated by the operated key.

4. In a calculating machine having a shaft angularly displaceable from a normal position in which it is adapted to control an accumulator for an adding operation to second and third positions in which it is adapted to control the accumulator for total and substotal taking operations respectively and having a pin carriage and numeral keys selectively registering amounts in the pin carriage and moving the pin carriage from a normal position when an amount is so registered, a shaft positioning mechanism comprising a combination add and total taking key, a combination add and subtotal taking key, a reciprocable slide operated by the total and subtotal taking keys from a normal add position to total and subtotal taking positions, means actuated by the pin carriage only when an amount is registered therein to lock the slide against movement from its add position, a timing means, a control arm selectively positioned by the slide for add, total, and subtotal taking operations and selectively moved by the timing means when the control arm is in its total and subtotal taking positions, and means connecting the control arm to the shaft to selectively position the shaft for adding, total, and substotal taking operations.

5. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is so registered, a shaft positioning mechanism comprising a combination add and total taking key, a combination add and subtotal taking key, a reciprocable slide operated by the total and subtotal taking keys from a normal add position to total and subtotal taking positions, a spring biased linkage actuated by the pin carriage when an amount is registered therein from a normal position to a position locking the slide against movement from its add position, a motor driven crank, a control arm selectively positioned by the slide for add, total, and subtotal taking operations and engaged and selectively moved by the crank when the control arm is in its total and subtotal taking positions, and means connecting the control arm to the shaft selectively to position the shaft for adding, total, and subtotal taking operations.

6. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is so registered, a shaft positioning mechanism comprising a combination add and total taking key, a combination add and subtotal taking key, a reciprocable slide operated by the total and subtotal taking keys from a normal add position to total and subtotal taking positions, a spring biased linkage actuated by the pin carriage when an amount is registered therein to lock the slide against movement from its add position, a control arm, linkage connecting the control arm to the slide for selective positioning of the control arm for add, total, and subtotal taking operations, a motor operated crank engaging and selectively moving the control arm when the latter is in its total and subtotal taking positions, and means connecting the control arm to the shaft selectively to position the shaft for adding, total, and subtotal taking operations.

7. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is registered, a shaft positioning mechanism comprising a combination add and total taking key, a combination add and subtotal taking key, a slide operable by the combination keys from a home position for an adding operation to second and third positions for total and subtotal taking operations, linkage controlled by the pin carriage latching the slide against movement by the combination keys while an amount is registered in the pin carriage, a control crank operated in timed relation with the operation of the machine, a control arm selectively positioned by the slide for add, total, and subtotal taking operations and engaged and selectively moved by the control crank when the control arm is in total and subtotal taking positions, and means connecting the control arm to the shaft to selectively position the shaft for add, total, and subtotal taking operations.

8. In a calculating machine having a shaft angularly displaceable from a normal position in which it is adapted to control an accumulator for an adding operation to second and third positions in which it is adapted to control the accumulator for total and subtotal taking operations respectively and having a pin carriage and numeral keys selectively registering amounts in the pin carriage and moving the pin carriage from a normal position when an amount is registered, a shaft positioning mechanism comprising a combination add and total taking key, a combination add and subtotal taking key, a pivotal bell crank lever sensing the position of the pin carriage, a spring biased pivotal second lever engaging the bell crank lever and having a roller, a third pivotal lever having a lug, a spring connecting the second and third levers and urging the third lever into engagement with the roller, a reciprocable slide having a notch engaged by the lug when an amount is registered in the pin carriage to lock the slide in a home position for an adding operation, means including the combination keys for moving the slide to total and subtotal taking positions when no amount is registered in the pin carriage, a pivotal arm having a pivotal connection with the slide, a link pivotally connected to the arm, an accumulator control arm pivotally connected to the link and having a pair of projections moved from normal positions to total and subtotal taking positions by the slide upon actuation of the combination keys when no amount is registered in the pin carriage, means connecting the control arm to the shaft, a pivotal control crank movable into engagement with one of the control arm projections in its total taking position and the other projection in its subtotal taking position to selectively position the shaft for total and subtotal taking operations, and a motor driven timing means operating the crank to selectively move the shaft to total and subtotal taking positions for movement of the accumulator in timed relation with the operation of the machine.

9. In a calculating machine having a pin carriage and numeral keys for registering amounts in the pin carriage and having a restoring arm normally operable to clear the amount in the pin carriage, the combination comprising a repeat key having a stem, linkage including a lever pivotally carried on the repeat key stem operated by the repeat key and engaging the restoring arm to prevent clearing of the amount from the pin carriage, means retaining the repeat key in an operated position, a correction key having a stem, means latching the correction key in operated position, means releasing the latching means during the latter portion of the machine cycle, spring means for restoring the correction key to normal position, and means connecting the correction key stem to the lever pivotally carried on the repeat key stem to disengage the linkage from the restoring arm while the correction key is operated without affecting the position of the repeat key to permit clearing of the amount from the pin carriage and causing engagement of the linkage with the restoring arm upon restoration of the correction key.

10. In a calculating machine having a pin carriage and numeral keys for registering amounts in the pin carriage and having a restoring arm normally operable to clear an amount in the pin carriage, the combination comprising a correction key having a stem carrying a stud, a repeat key having a stem, a lever pivoted on the stem and having a slot receiving the stud on the correction key, linkage operated by the lever upon depression of the repeat key engaging the restoring arm to prevent clearing of the amount from the pin carriage, means retaining the repeat key in an operated position, the stud on the correction key pivoting the lever on the repeat key stem upon actuation of the correction key to disengage the linkage from the restoring arm to permit clearing of the amount from the pin carriage and causing reengagement of the linkage with the restoring arm upon restoration of the correction key.

11. In a calculating machine having a pin carriage and numeral keys for registering amounts in the pin carriage and having a restoring arm for clearing an amount from the pin carriage, a repeat key having a stem and means for maintaining the repeat key in operated position, a lever pivotally supported on the stem and having a slot at one end thereof, a correction key having a stem with a stud received in the slot to cause pivotal movement of the lever about the stud upon depression of the repeat key, linkage operated by the lever upon depression of the repeat key to engage the restoring arm for preventing clearing of the amount from the pin carriage, the lever pivotally moved by the stud about its pivotal connection with the repeat key stem upon actuation of the correction key to cause disengagement of the linkage from the restoring arm, spring biased latching means for holding the correction key in its actuated position, timing means controlled by the actuation of the correction key for disengaging the correction key latch means in timed relation with the operation of the machine, and a second latching means for the correction key effective upon disengagement of the first latch means to hold the correction key in a partially actuated condition until the end of the machine cycle to prevent a second depression of the correction key prior to resetting of the machine.

12. The combination of claim 11 together with a plurality of control keys having stems, pivotal pendants adjacent the control key stems, a stud carried by each of the stems moved into actuated position between adjacent pendants upon actuation of its respective key, and linkage operated by the correction key pivoting the pendants into engagement to prevent movement of the studs to their actuated positions.

References Cited by the Examiner
UNITED STATES PATENTS

| 2,424,359 | 7/47 | Liljestrom | 235—60 |
| 2,710,139 | 6/55 | Swanson | 235—60 |
| 2,942,776 | 6/60 | Anderson | 235—60 |

FOREIGN PATENTS

| 809,523 | 2/59 | Great Britain. |

LEO SMILOW, *Primary Examiner.*